March 18, 1941.  E. MOLLOY ET AL  2,235,034
BEACHING GEAR
Filed Feb. 28, 1940   5 Sheets-Sheet 1

INVENTORS
EDDIE MOLLOY and
WILLIAM C. KELLER.
BY
ATTORNEY

March 18, 1941.  E. MOLLOY ET AL  2,235,034
BEACHING GEAR
Filed Feb. 28, 1940  5 Sheets-Sheet 2

INVENTORS
EDDIE MOLLOY and
WILLIAM C. KELLER.
BY
ATTORNEY

INVENTORS
EDDIE MOLLOY and
WILLIAM C. KELLER.
BY
ATTORNEY

March 18, 1941.  E. MOLLOY ET AL  2,235,034
BEACHING GEAR
Filed Feb. 28, 1940   5 Sheets-Sheet 4

INVENTORS
EDDIE MOLLOY and
WILLIAM C. KELLER
BY
ATTORNEY

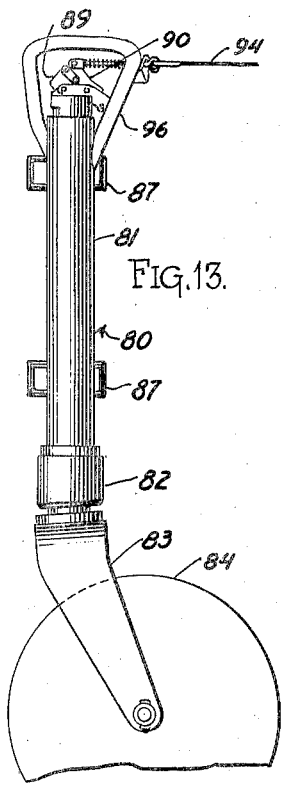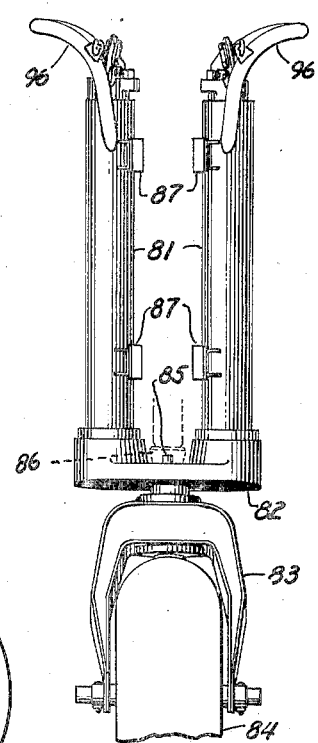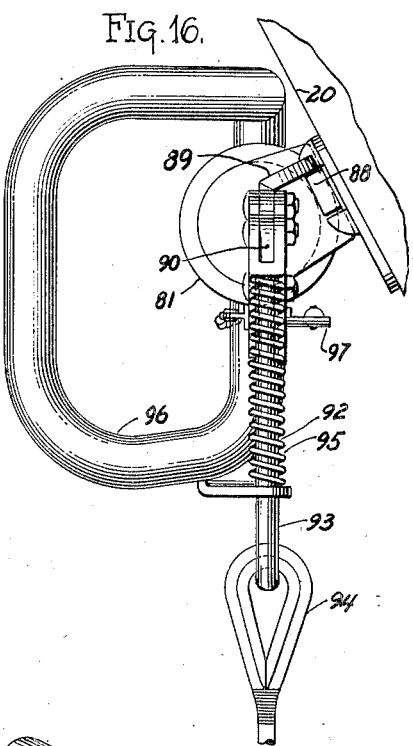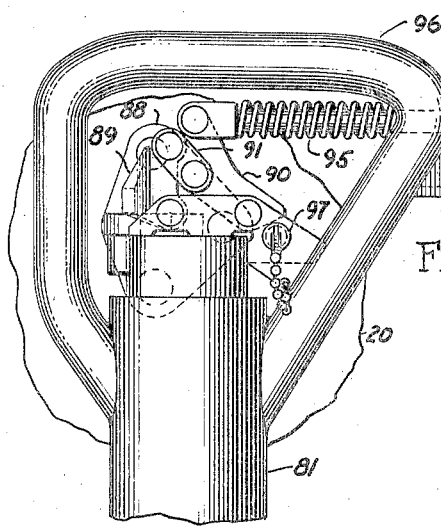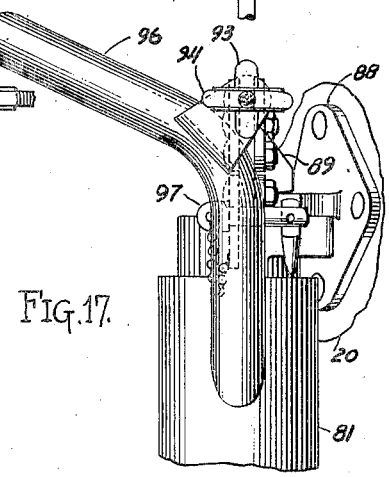

Patented Mar. 18, 1941

2,235,034

UNITED STATES PATENT OFFICE 2,235,034

BEACHING GEAR

Eddie Molloy, Ypsilanti, Mich., and William C. Keller, North Tonawanda, N. Y., assignors to Curtiss-Wright Corporation, a corporation of Delaware Application February 28, 1940, Serial No. 321,174

6 Claims. (Cl. 280—61)

This invention relates to wheeled beaching gear for flying boats and seaplanes and comprises in particular improvements in beaching gear to render same more easily handled both in the water and on land.

The provisions of the invention are distinct from wheeled landing gears permanently carried by an aircraft which are retractable when water operation is contemplated. In such amphibian aircraft the landing gear constitutes an extra permanent load which is unnecessary and undesirable where water operation is the primary consideration. However, removal of seaplanes and flying boats from the water is occasionally necessary for repair and cleaning and to this end, wheeled cradles or chassis have been used by which the aircraft, after attachment and securement of the wheeled gear, may be rolled from the water, up a ramp, and on to dry land. When the aircraft is again placed in the water the beaching gear is removed.

An object of this invention is to provide a beaching gear which comprises several units each of which is relatively light and easy to handle, as distinguished from prior beaching gears which were awkward and bulky and required the services of a number of attendants for their manipulation attachment and detachment. In the present invention, the several units of the beaching gear may readily be handled by a small complement of men and removal of the beaching gear after the aircraft has been placed in the water may readily be accomplished by a single operator.

A further object of the invention resides in the provision of means by which a plurality of the separate units of the beaching gear may be temporarily secured to one another for easy manipulation on land.

Still another object comprises the provision of beaching gear units adapted for easy attachment to suitable fittings upon the aircraft hull, as well as the provision of a detachable tail wheel unit for the hull which may swivel freely when the aircraft is being manipulated on the ground.

In general, present requirements for beaching gears include the ready attachment and shedding of the beaching gear while the aircraft is afloat without undue submersion of the crew. Also, all movable fittings in the gear must be manipulatable above the water line. Provision must be made so that wheels and tires may be readily changed on the beaching gear while the aircraft is on land.

The invention has been developed to meet the above requirements and to fulfill the above named objects, and other objects will be apparent in reading the annexed detailed description in connection with the drawings, in which:

Figs. 13 and 14 are respectively side and aft elevations of the tail unit of the beaching gear, detached from the hull;

Fig. 15 is a fragmentary enlarged side elevation of the top part of the tail beaching unit, and Figs. 16 and 17 are, respectively, plan and rear views of the portion of the tail beaching gear unit shown in Fig. 15.

Figure 1:
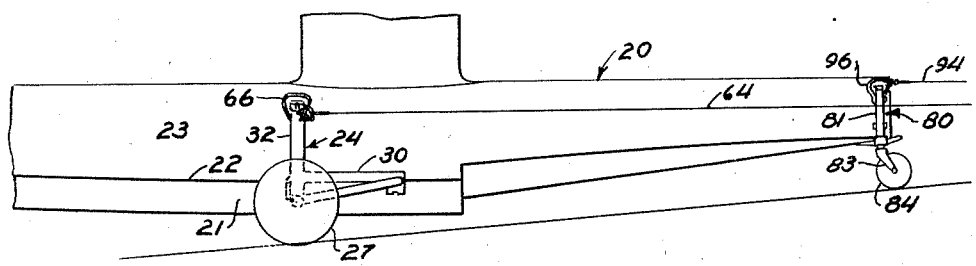
Fig. 1 is a side elevation of an aircraft float or hull provided with the invention.

Referring first to the first and second figures, we show a hull or pontoon 20 of conventional character, which comprises bottom portions 21 terminating laterally at chines 22 from which curved sides 23 extend upwardly to comprise at their upper portions a curved deck. The beaching gear preferably comprises three units, two of which indicated in their entirety as 24, are vis-a-vis and are disposed ordinarily, forward of the center of gravity of the aircraft. These units, as will be apparent from the other figures, each comprise an axle member 26 carrying a wheel 27, the axle member carrying a bearing pad 28 engaging a complementary bearing pad 29 permanently secured over the chine 22 of the hull. A longitudinal member 30 extends rearwardly from the inner end of the axle member 26 to carry a pad 31, similar to the pad 28, bearing upon another complementary pad on the hull chine. A triangulated structure 32 extends vertically from the axle member 26 and carries at its upper end a pad 33 which is engageable with a complementary pad 34 secured to the hull side 23. The pads such as 29 on the hull are provided with blind holes adapted to be engaged by bolts 36 and 37 respectively at the front and rear of the unit, slidable in the pads 28 and 31 and are coincidentally operable as shown in Figs. 5, 10, 11 and 12 by a longitudinal shaft 38 carrying levers 39 and 40 clevised to the bolts 36 and 37. The lever 40 is secured to the shaft 38 while the lever 39 is secured to the shaft through a spring connection 42 for a purpose which will shortly be disclosed. The shaft is carried in bearing brackets 43 secured to the member 30. Said shaft also carries a lever 44 to which is clevised a rod 45 extending vertically toward the upper pad 33, the details of which are shown in Figs. 4 to 8.

Figure 2:
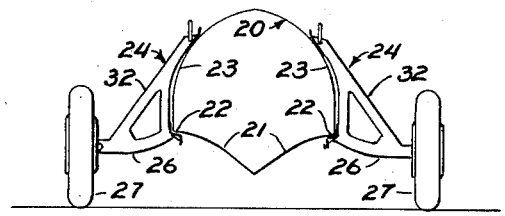
Fig. 2 is a front view of the hull with the beaching gear attached.
Figure 6:
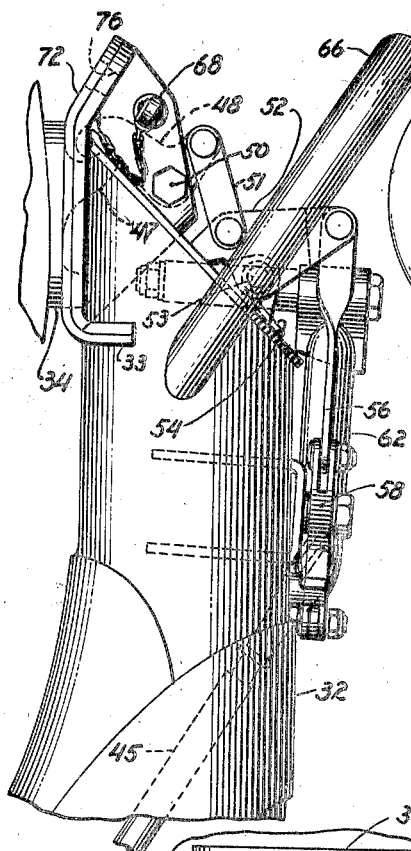
Figs. 6, 7 and 8 are respectively front, side and top views of enlarged portions of one of the beaching gear units.
Figure 7:
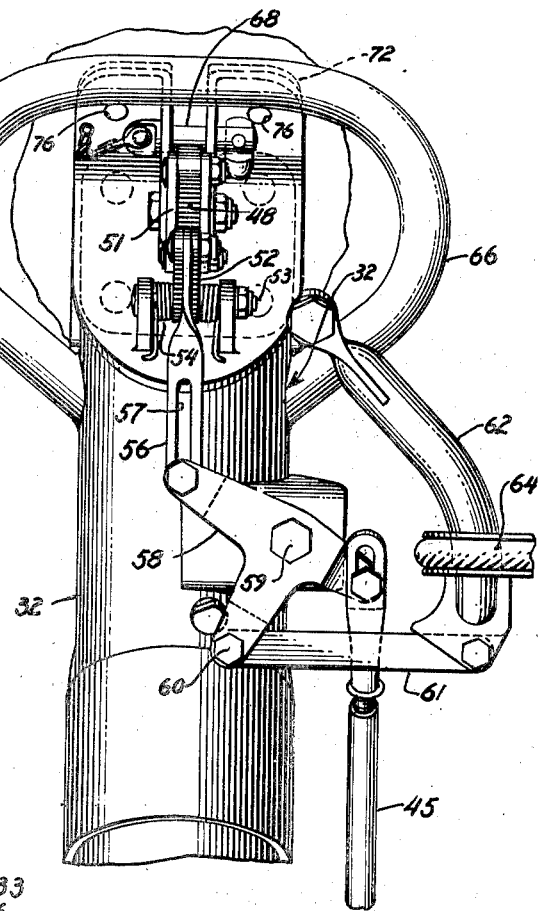
Figure 8:
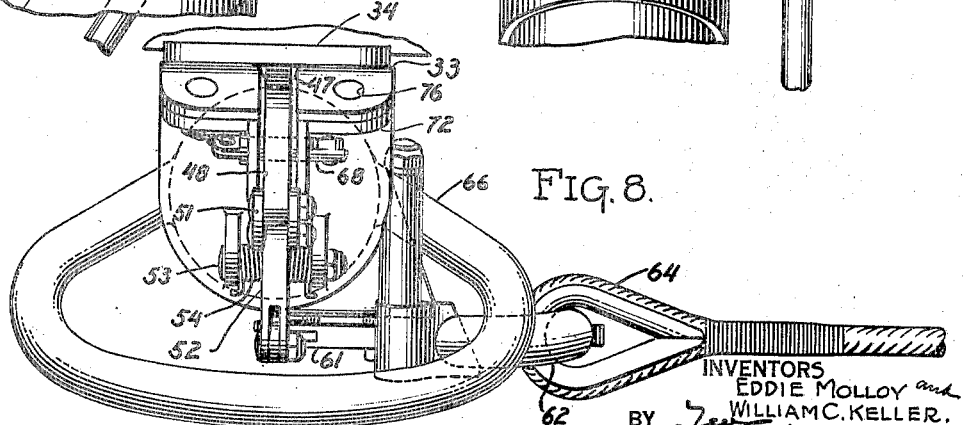
Figure 9:
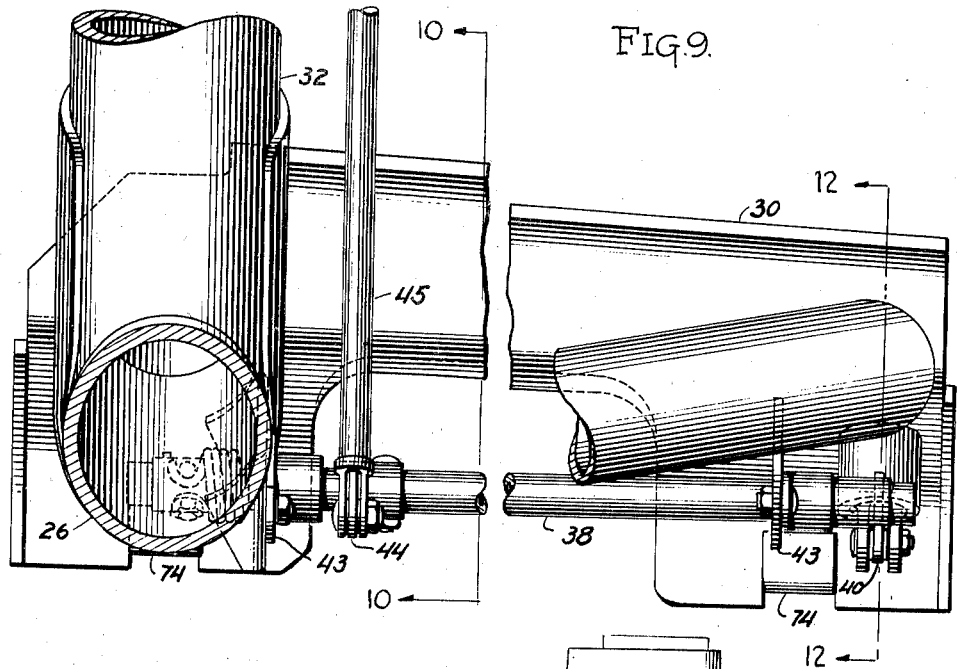
Fig. 9 is a fragmentary side elevation of the lower part of one of the beaching units.
Figure 10:
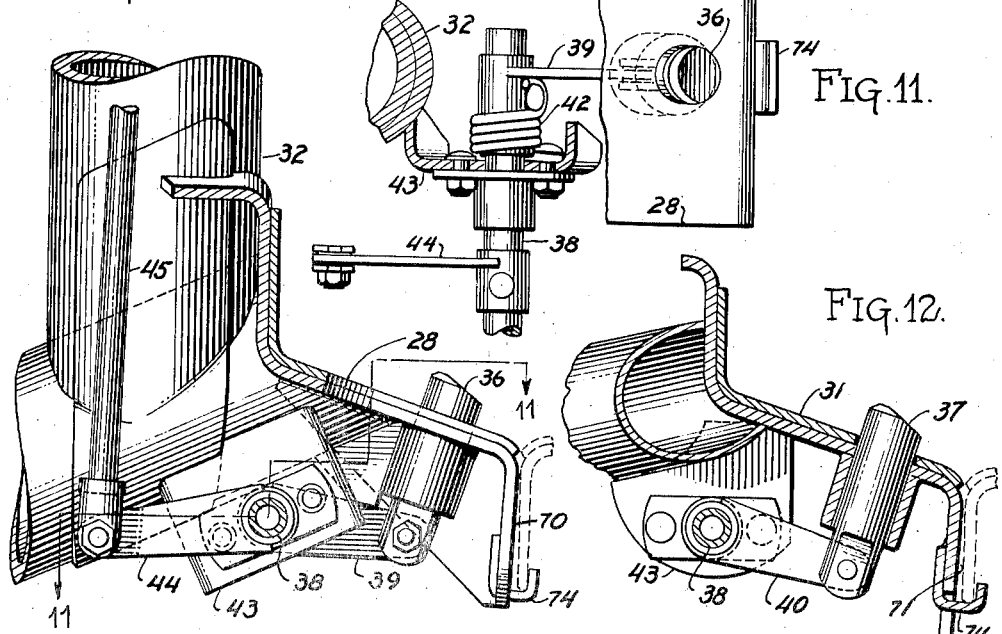
Fig. 10 is a section on the line 10—10 of Fig. 9.
Figure 11:
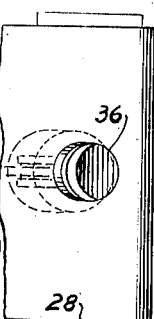
Fig. 11 is a section on the line 11—11 of Fig. 10.
Figure 12:
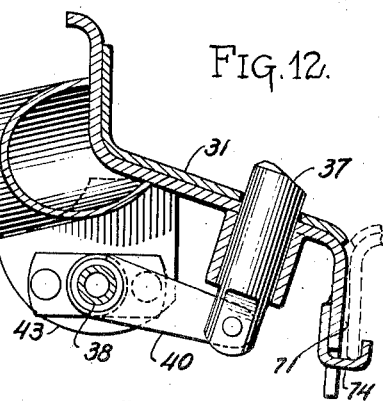
Fig. 12 is a section on the line 12—12 of Fig. 9.

The upper hull pad 34 carries a hook 47 over which a swingable hook 48, pivoted to the structure 32 at 50 may engage, the hook 48 being swingable about its pivot through a link 51 connecting to a lever 52 pivoted to the structure 32 at 53 which has a spring 54 urging the lever 52 counter-clockwise as shown in Fig. 6. It will be seen that the lever 52 when urged counter-clockwise tends to move the hook 48 counter-clockwise and the pivot 53 is so disposed with respect to the pivots at the ends of the link 51 that the hook 48 will be locked into engagement with the hook 47. However, if the lever 52 is rotated clockwise, the hook 48 will be lifted out of engagement with the hook 47. A link 56 connects the lever 52, through a lost motion slot 57, with a bell crank 58 pivoted to the structure 32 at 59, that portion of the bell crank opposite to the pivot having a lost motion connection with the rod 45. A third leg of the bell crank is pivoted at 60 to a link 61 in turn pivoted to a handle 62 hinged at its opposite ends to the structure 32. By drawing the handle 62 rearwardly, or to the right as shown in Fig. 7, the link 56 is drawn downwardly and the rod 45 is pulled upwardly whereby coincidental unlocking of the hook 48 and of the bottom lugs 36 and 37 is effected. The lost motion connections allow for independent resiliently pressed re-engagement of the lugs with the hull fittings when the beaching gear is applied to the fuselage. A hand line 64 engages the handle 62, this hand line extending rearwardly of the hull so that, when the aircraft has been rolled into the water, an operator on land may jerk the hand line 64 to unlock the beaching gear from the hull so that the gear may be pulled ashore. The above description applies equally to the two opposed beaching gear units 24 shown in Fig. 2, and a hand line 64 is utilized for each. The upper part of the structure 32 may be provided with a handle 66 for manipulation of the gear in the water when the gear is being applied to the hull.

In applying the gear to the hull when in the water, an operator either from a small boat or from the water, disposes a beaching gear unit alongside the hull. The hook 48 at the top of the unit is first secured in position by the insertion of a locking pin 68 shown in Fig. 6. The hook 48 is then engaged over the hull hook 47 and the operator then presses downwardly and inwardly upon the unit, using the hooks 47 and 48 as a fulcrum, until the bearing pads 28 and 31 slip over the coacting bearing pads on the hull, and the lugs 36 and 37 spring into engagement with the recesses provided therefor in the hull pads. Thus, no separate locking or latching operations are involved in applying the beaching unit to the hull. The pin 68 after application of the beaching unit prevents removal thereof which might otherwise occur through inadvertent manipulation of the handle 62 or the hand line 64. The pin 68 must be removed before the beaching unit can be shed from the hull.

In connection with the wheels 27 it is found convenient to use conventional aircraft wheels having brake drums 70 facing outwardly, the drums providing a foot rest to assist the operator in submerging the beaching unit and in locating same in proper relation on the hull. As a further accessory, the structure 32 may have floats secured thereto in the form of hollow containers, cork or the like, so that, when detached from the hull, the beaching unit floats on the surface of the water.

Figure 3:
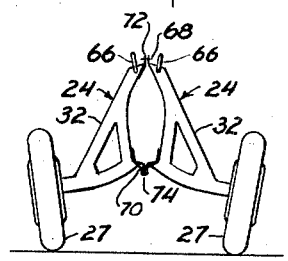
Fig. 3 is a front view of the beaching gear arranged for ground manipulation without the hull.
Figure 4:
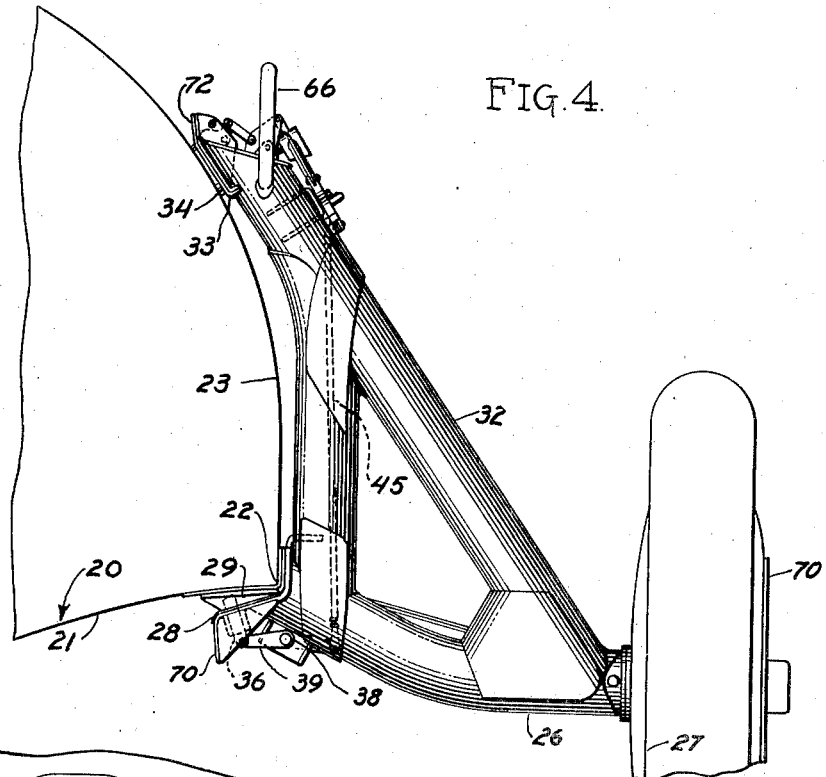
Fig. 4 is an enlarged front elevation of one unit of the beaching gear secured to the hull.
Figure 5:
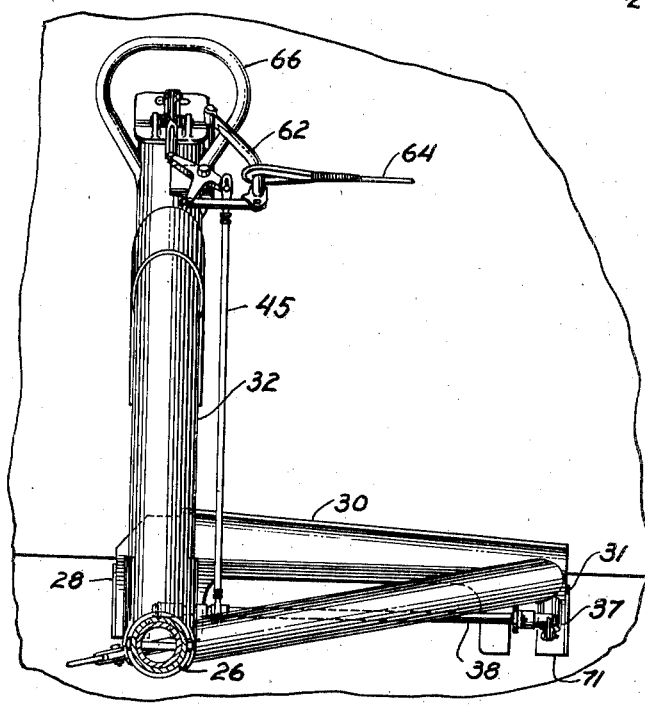
Fig. 5 is a side elevation of part of the beaching gear secured to the hull.

When the two vis-a-vis units are detached from the hull and are brought to land, they may be assembled to one another for convenience in handling to provide a two-wheeled dolly according to Fig. 3. To this end, bearing pads 28, 31 and 33 are respectively provided with accessory pads 70, 71 and 72 in substantially coplanar relationship for engagement with corresponding pads on the opposite beaching unit. The lower pads 70 and 71 on one unit are provided with hooks 74 (Figs. 9, 10, 11 and 12) which may be engaged over the bottom edge of cutouts in the pads 70 and 71 of the other unit, and the safety pins 68 of respective units may be passed through holes 76 in the pads 72 by which the two units are secured against relative displacement.

Now referring to Figs. 13 to 17, in connection with Fig. 1, we show a demountable swivel tail unit 80 which comprises substantially vertical posts 81 spaced apart by a bottom yoke 82 which carries a swiveling tail wheel fork 83 on which is borne a tail wheel 84. The upper surface of the yoke 82 between the posts 81 carries a fixed pin 85 engageable in a suitable recess formed in a pad 86 fixed to the bottom rear corner of the hull 20. This element 86 may comprise a skid to protect the back of the hull from damage. Bearing pads 87 in vis-a-vis relation are secured near the upper and lower parts of the posts 81, these pads being so disposed as to bear upon corresponding fixed pads on the sides of the hull. Near the top of the stern of the hull latch fittings 88 are secured as shown in Figs. 16 and 17 which are engageable by pivoted locks 89 at the tops of the two posts 81. The locks are actuated by levers 90 linked at 91 between the members 89 and 90, the link end pivots being so disposed with respect to the pivot of the lever 90 as to prevent swinging of the lock 89 when the lever 90 is moved to the full counter-clockwise position as shown in Fig. 15. The lever 90 is operated by a pull rod 92 having an eye 93 to which a hand line 94 is attached, and a spring 95 bearing upon part of a handle 96 and upon the clevis end of the rod 92 serves to urge the lock 89 toward the locking position. A safety pin 97 may be passed through the bracket at the top of each post 81 to prevent unlocking movement of the lever 90 when the tail beaching unit is in position upon the hull. It will be noted that similar vis-a-vis locking arrangements are disposed at the top of each post 81 and the hand lines 94 therefrom may be spliced together a short distance rearwardly from the beaching unit. Installation of the unit in the water is accomplished by submerging the bottom of the unit, engaging the pin 85 with the recess on the hull and in then pressing the upper parts with the posts 81 forwardly until the locks 89 snap into engagement with the latch fittings 88 on the hull, after which the safety pins 97 may be inserted. To remove the unit from the hull it is merely necessary to jerk the hand line 94 which disengages the lock 89 from the hull and pulls the unit rearwardly to allow disengagement of the pin 85 from the hull whereupon the unit floats on the surface of the water and may be hauled ashore. Since the tail unit 80 is not particularly bulky or heavy it may be readily handled on land by a single person. The handles 96 are convenient both for locating the unit when being applied to the hull and also for wheeling the unit along the ground.

If the several beaching gear units are of large size as might be necessary for exceptionally large aircraft, arrangements might be made to temporarily secure the tail unit 80 to the forward beaching units 24 to allow of a joint ground manipulation as a three-wheeled chassis.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. Beaching gear for boat hulls having chines and substantially upright sides, the bottom having a recess close to the chine and the side having a recess above the chine, comprising a unitary structure including an axle and wheel thereon, the structure having bearing pads disposed to engage the bottom and hull side, movable lock lugs on the structure engageable with said bottom and side recess to secure the gear to the hull, said lugs being resiliently urged toward recess engagement, and coincidental operators for disengaging the lugs from the recesses.

2. A beaching gear for a hull comprising a pair of vis-a-vis units having axles and wheels thereon, each having a plurality of pads and locks for detachable engagement with the hull, and each having at least two elements for engagement with corresponding elements of the other unit when the units are detached from the hull whereby the two units may be temporarily assembled to one another for ease of manipulation.

3. A beaching gear for a hull comprising a pair of vis-a-vis units having axles and wheels thereon, each having a plurality of spring-pressed hull-engaging latches adapted to lock the gear upon assembly thereof to the hull, and means for simultaneously disengaging said latches for disassembly of said units from the hull, said units having a plurality of inter-engageable elements thereon to lock the units to one another for joint handling when separated from the hull.

4. A beaching gear for a hull comprising a pair of frame members each having a wheel journalled thereon at its lower end the wheel being laterally offset from the member whereby the member and wheel together are unstable, means to secure the members of the pair to one another with the planes of the wheels spaced and parallel to afford joint maneuverability of the gear, and means on the members to secure them to opposite sides of the hull when the members are detached from one another.

5. A beaching gear for a boat hull having chines and substantially upright sides, the hull having longitudinally spaced openings close to each chine and the side having an opening above each chine, comprising a unitary wheeled structure for each side of the hull including bearing means to engage the bottom and side of hull adjacent said openings, movable locking devices on the structure each engageable with (and resiliently urged toward) engagement with one said opening to secure the structure to the hull, and mechanism on each structure operable to simultaneously disengage said locking devices from hull engagement.

6. A beaching gear for a boat hull having chines and substantially upright sides, the hull having longitudinally spaced openings close to each chine and the side having an opening above each chine, comprising a unitary wheeled structure for each side of the hull including bearing means to engage the bottom and side of hull adjacent said openings, movable locking devices on the structure each engageable with (and resiliently urged toward) engagement with one said opening to secure the structure to the hull, and mechanism on each structure operable to simultaneously disengage said locking devices from hull engagement.

EDDIE MOLLOY.
WILLIAM C. KELLER.